United States Patent
Kumar et al.

(10) Patent No.: US 7,432,002 B2
(45) Date of Patent: Oct. 7, 2008

(54) METHOD FOR REGENERATION OF PERFORMANCE IN A FUEL CELL

(75) Inventors: Sridhar Makam P. Kumar, Hockessin, DE (US); Tuyu Xie, Kingston (CA); Mohamed Abdou, Chadds Ford, PA (US); Peter Andrin, Napanee (CA)

(73) Assignee: E.I. du Pont de Nemours and Company, Wilmington, DE (US)

( * ) Notice: Subject to any disclaimer, the term of this patent is extended or adjusted under 35 U.S.C. 154(b) by 327 days.

(21) Appl. No.: 10/527,759

(22) PCT Filed: Sep. 30, 2003

(86) PCT No.: PCT/US03/31235

§ 371 (c)(1),
(2), (4) Date: Jan. 23, 2006

(87) PCT Pub. No.: WO2004/030118

PCT Pub. Date: Apr. 8, 2004

(65) Prior Publication Data

US 2006/0172159 A1  Aug. 3, 2006

(51) Int. Cl.
*H01M 8/04* (2006.01)

(52) U.S. Cl. .............................. 429/13; 429/17; 429/23; 429/24

(58) Field of Classification Search .................. 429/12, 429/13, 17, 21, 23, 24, 38, 39
See application file for complete search history.

(56) References Cited

U.S. PATENT DOCUMENTS

| | | |
|---|---|---|
| 6,265,092 B1 | 7/2001 | Meltser et al. |
| 6,479,177 B1 | 11/2002 | Roberts et al. |
| 6,656,639 B1 | 12/2003 | Hagg et al. |
| 2002/0182456 A1 | 12/2002 | Condit et al. |
| 2003/0077493 A1* | 4/2003 | Colborn et al. ............... 429/23 |
| 2003/0224228 A1 | 12/2003 | Reiser et al. |

* cited by examiner

*Primary Examiner*—Stephen J. Kalafut

(57) ABSTRACT

A process for improved performance in at least one fuel cell, having a loss in power output of at least 5% of an initial power output, wherein the fuel cell comprises a cathode, an anode, an anode chamber, a cathode chamber, a fuel comprising an anolyte that flows through the cell, and a catholyte gas, wherein the fuel cell is connected to an external load, and wherein the process includes the steps of taking the load off the fuel cell; and applying an external electric field from an external power source to the fuel cell to reverse electrochemical reactions until at least 5% of the lost power output is regained. Purging the fuel cell further enhances regeneration of the cell.

37 Claims, 2 Drawing Sheets

METHOD FOR REGENERATION OF PERFORMANCE IN A FUEL CELL

FIELD OF THE INVENTION

This invention relates to the regeneration of performance of a fuel cell and stack thereof, and more particularly to methods for regeneration of a direct feed fuel cell, such as a direct methanol fuel cell (DMFC), and stack thereof.

BACKGROUND OF THE INVENTION

Solid polymer electrolyte fuel cells employ a membrane comprising a solid polymer electrolyte disposed between two porous electron and proton conductive electrodes, the anode and the cathode compartments. The anode and cathode compartments include catalyst layers, gas diffusion layers, and electron conductive flow field plates. Fuel is fed into the anode flow field, diffusing onto the porous catalyst layer, and is oxidized to produce electrons, protons, and $CO_2$ as a by-product when methanol aqueous solution is used as fuel. The polymer electrolyte membrane is proton conductive allowing the protons to migrate towards the cathode. At the same time, oxidant is fed into the cathode compartment wherein the oxidant diffuses onto the porous cathode catalyst layer and reacts with the protons and electrons, producing water as a by-product. The electrons travel from the anode to the cathode through an external circuit, thus producing the desired electrical power.

In stationary applications, fuel cell systems may be required to operate continuously for a period of time. However, in portable or traction power applications, fuel cell systems may be subjected to frequent start-up and shut down cycles. In either case, the fuel cell is expected to provide a reliable power output under specified conditions. Unfortunately, the power output of the fuel cell decreases with operation time under the same operating conditions. For example, fuel cell or stack voltage decays with time at a given operating current density, or vice versa. This cell or stack voltage decay obviously affects overall fuel cell efficiency. More importantly, it may limit fuel cell applications. Therefore, the recovery of fuel cell performance after a period of operation or bringing a fuel cell to a starting up condition after a period of operation is very important in a fuel cell application.

A need exists for a method for regeneration of performance of a fuel cell, typically a liquid feed fuel cell, after a period of operation and a method for start up of a fuel cell system after a period of operation.

SUMMARY OF THE INVENTION

In a first aspect, the invention provides a process for improved performance in at least one fuel cell, having a loss in power output of at least 5% of an initial power output, comprising a cathode, an anode, an anode chamber, a cathode chamber, a fuel comprising an anolyte that flows through the cell, and a catholyte gas, wherein the fuel cell is connected to an external load, and wherein the process comprises:

(a1) taking the load off the fuel cell; and
(a2) applying an electric field from an external power source to the fuel cell until at least 5%, typically at least 25%, and more typically at least 50%, of the lost power output is regained.

In the first aspect, applying an electric field from an external power source to the fuel cell occurs by:

(a2a) cycling between a minimum voltage and a maximum voltage applied to the fuel cell until a maximum current is reached,
(a2b) cycling between a minimum current and a maximum current applied to the fuel cell until a minimum voltage is reached,
(a2c) applying an alternating voltage (AC voltage) until a maximum current is reached,
(a2d) applying an alternating current until a maximum voltage is reached across the fuel cell,
(a2e) applying a constant voltage until a maximum current is reached, or
(a2f) applying a constant current until a minimum voltage is reached;

In the first aspect, the invention further provides a process wherein before step (a2), the process further comprises:

(b) clearing the fuel cell of any liquid present therein to achieve a resistance of at least about 10% higher, more typically at least about 20% higher, and still more typically about 100 to about 500% higher, than the value before clearing the cell of any liquid; and
(c) starting the flow of anolyte through the fuel cell.

DETAILED DESCRIPTION OF THE INVENTION

A process is provided for improved performance in at least one fuel cell comprising a cathode, an anode, a fuel comprising an anolyte that flows through the cell, and a catholyte, wherein the fuel cell is connected to an external load, and wherein the process comprises taking the load off the fuel cell; and applying an electric field from an external power source to the fuel cell to reverse electrochemical reactions until at least 5%, typically at least 25%, and more typically at least 50%, of the lost power output is regained. The fuel cell may be a direct feed fuel cell, wherein the fuel is in the liquid or vapor phase. Some suitable fuels include alcohols such as methanol and ethanol; ethers such as diethyl ether, etc.

For the purpose of this application, the term "anode" is used to describe the component of the fuel cell comprising the anode flow field plate, anode gas diffusion layer and anode catalyst layer. The term "cathode" is used to describe the component of the fuel cell comprising the cathode flow field plate, cathode gas diffusion layer and cathode catalyst layer.

Power source is defined as a means for providing power or an electric field. Some examples of power sources include batteries, capacitors, solar cells, another fuel cell, etc.

The term "stack" refers to a fuel cell stack comprising a series of fuel cells functioning in tandem electrically.

Figure 1:
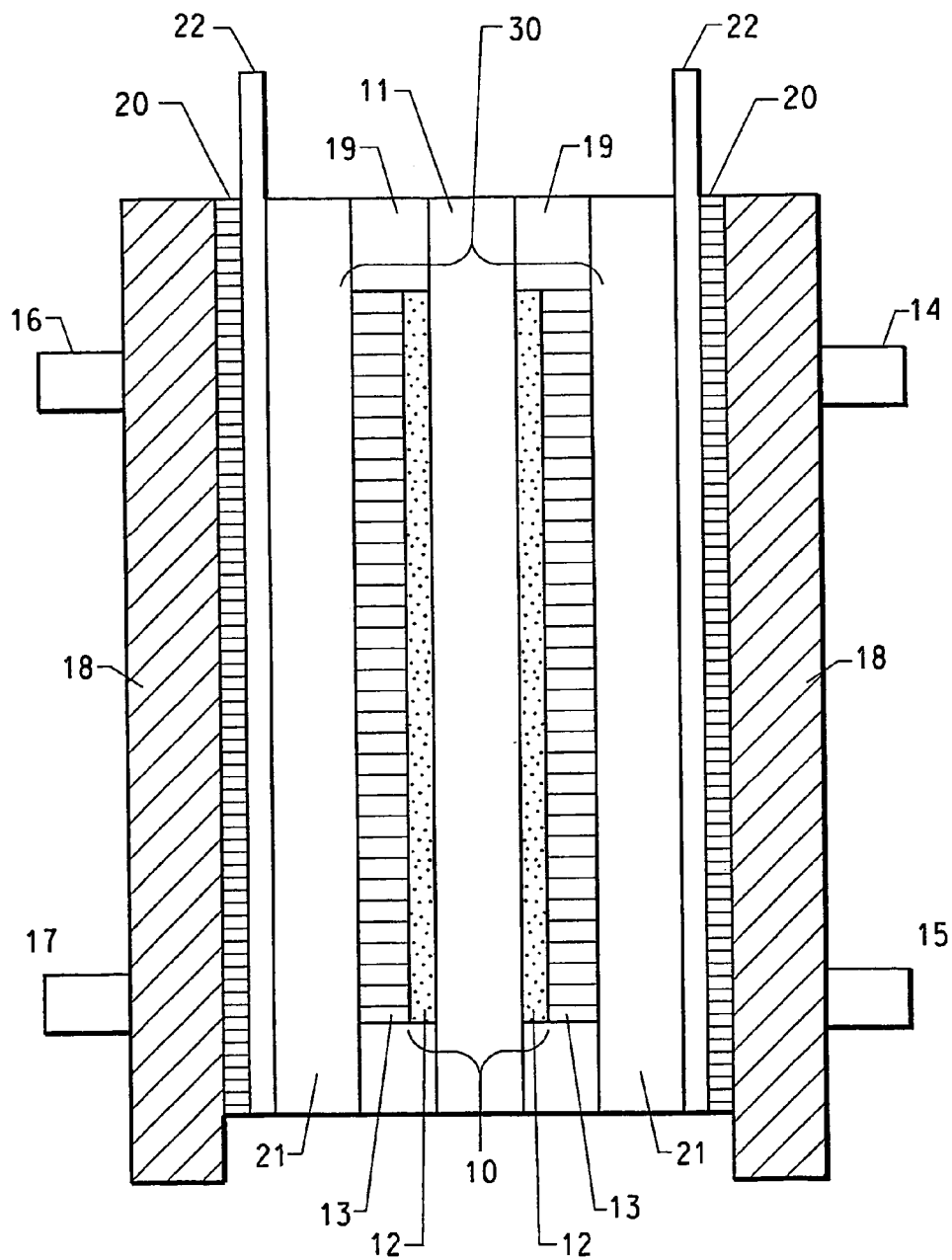
FIG. 1 is a schematic illustration of a single cell assembly.

Fuel Cell:

FIG. 1 schematically illustrates a single cell assembly. As shown in FIG. 1, the MEA (30) comprised a catalyst coated membrane, (CCM) (10) sandwiched between two sheets of the gas diffusion backing, (GDB) (13). The anode and cathode gas diffusion backings (13) may comprise carbon paper or cloth and typically a fluorinated polymeric surface-treating agent, although other surface treatments may be used. A microporous layer or layers such as those manufactured by E-Tek Inc., Natick, Mass. may also be present in the cathode gas diffusion backing wherein the microporous layer may typically be disposed toward the cathode catalyst. A glass fiber reinforced silicone rubber gasket (19), for example (Furan—Type 1007, obtained from Stockwell Rubber Company), cut to shape to cover the exposed area of the membrane of the CCM, may be placed on either side of the CCM/GDB assembly (taking care to avoid overlapping of the GDB and the gasket material). The entire sandwich assembly may be assembled between the anode and cathode flow field graphite plates (21). One such 25 cm$^2$ standard single cell assembly may be obtained from Fuel Cell Technologies Inc., Los Alamos, N. Mex. The cell shown in FIG. 1 may also be equipped with anode inlet (14), anode outlet (15), catholyte gas inlet (16), catholyte gas outlet (17), aluminum end blocks (18), tied together with tie rods (not shown), electrically insulating layer, (20), and gold plated current collectors, (22).

Bolts on the outer plates (not shown) of the single cell assembly may be provided and tightened with a torque wrench to a torque of 1.5 ft. lb.

A characteristic of direct feed fuel cells, and in particular direct methanol fuel cells, using a solid polymer electrolyte membrane is that the liquid feed, e.g. aqueous methanol solution, is directly used as fuel. Aqueous methanol solution is fed into the anode of the fuel cell. Air or oxygen is fed into the cathode of the fuel cell. In a DMFC operation, both methanol and water will transport through the proton conductive membrane from the anode to the cathode by both diffusion and osmotic drag. In addition to water crossover, water is also generated at the cathode as a by-product. Therefore, the cathode electrode could be flooded with water if the water removal rate is smaller than the water generation rate at the cathode.

It is desirable to have a stable power output at given fuel cell operating conditions. Unfortunately, fuel cell power output decays with operating time while other operating conditions are kept the same. Because of this voltage decay, a DMFC stack may not be able to provide a desirable power output after a period of operation. Performance decay is an important issue in a DMFC application.

The factors causing the voltage decay may be very complex and some factors are outlined below. It may be one of the following factors or the combination of the following factors:

(1). Loss of active surface area of anode catalyst;
(2). Loss of active surface area of cathode catalyst;
(3). Effect of undesirable contaminations in the fuel feed or by-products generated from electrochemical reactions.
(4). Deterioration of materials used for the stack leading to increase in resistance;
(5). Accumulation of water at the cathode electrode;
(6). Accumulation of $CO_2$ at the anode electrode and the diffusion layer;
(7). Accumulation of CO at the anode electrode;
(8). Other causes;
(9). Combination of the factors above.

Factors (1) to (4) may cause physical/chemical changes of materials of construction of cells and stacks, whereas factors (5) to (7) are the effects caused by the operating conditions for a given fuel cell system, that result in a temporary decay. This invention discloses a method to recover the physical/chemical changes for given fuel cells and stack designs and operating conditions.

Process for Regeneration:

The following steps may be performed to regenerate a fuel cell: To start with, the cell was brought to an open circuit, i.e., the load on the cell was taken out. For example, a cell that has been operated for a period of time may have a voltage or power output about 5% lower than the desired value. The cell needing regeneration was then subjected to an external applied electric field to effect electrolysis of the cell fluids (i.e., fuel and oxidant). In one mode of regeneration, a variable DC voltage is applied to the cell/stack and is cycled a number of times between 0 to 1.7 V at a scan rate of 20 mV/sec till maximum electrolysis current is reached. About 1 to about 20 times, more typically 6 to about 10 times, with the anode flow continuing. Alternately, the applied voltage may be held at a constant voltage (e.g., 1.7 V) and the electrolysis current may be monitored till maximum current is achieved.

In a second embodiment, the following steps may be performed to regenerate a fuel cell: To start with, the cell was brought to an open circuit, i.e., the load on the cell was taken out. For example, a cell may have a voltage or power output about 5% lower than the desired value. Optionally, an impedence meter may be connected across a cell needing regeneration wherein the drop in power output was dependant on the end use application. This was done under load (at the desired current density) to measure the cell resistance (both when on load and when on open circuit). The flow of anolyte such as a methanol solution, an ethanol solution, etc., was stopped. The anolyte temperature was dependant on the power output and other operating conditions for the cell. The catholyte gas, e.g. air, flow through the cell was continued throughout the process. Optionally, the flow of catholyte gas may be interrupted. The resistance of the cell may be closely monitored. After a certain period of time, the cell resistance slowly crept up and increased to very high values. Clearing the fuel cell of any liquid present therein results in a resistance of at least about 10% higher, more typically at least about 20% higher, and still more typically about 100 to about 500% higher than the value before clearing the cell of any liquid. Optionally, at this stage, the anode side was purged with air, nitrogen or exhaust from the cathode compartment. The cell was left under these conditions for a given period of time and then the anolyte flow through the cell was turned on, wherein the anolyte was at the desired temperature. Optionally, the desired temperature may be achieved using a pre-heater. The resistance of the cell may be monitored and the cell was cycled between no load and full load, for example, between open circuit voltage (OCV) and 0.2V, until the resistance dropped to values similar to those at the start of the regeneration process. The cell was then set at the given load and operation of the cell was resumed.

Following such a sequence of steps results in considerable improvement in performance of the cell after regeneration, both in terms of the power output and the rate of drop in voltage with time. Improved performance in the form of cell activation may also be further achieved using the external applied electric field until a maximum current was achieved.

In a separate embodiment, in addition to the above steps, the cathode was purged using air or nitrogen at open circuit condition of the stack after the stack was operated for a period of time. The performance of cell/stack can be further recovered by purging the cathode compartment when the cell/stack is at open circuit and anode fuel feed is turned off. The cathode chamber is purged with air, nitrogen or exhaust from the cathode compartment for at least about 10 seconds, typically about 30 seconds to about 5 minutes.

In a DMFC application, any purging required is a parasitic energy loss. Therefore, the shorter the duration of purging, the better. Based on the stack design used for this invention, a typical time range for anode purging is about 0.01 to about 30 minutes, typically about 0.1 to about 30 minutes. A more typical time range is about 1 to about 15 minutes. A typical time range for the cathode purge is less than 5 minutes. A typical purging temperature is the cell/stack operating temperature. The cell/stack temperature could decrease during the purge operation.

In a multiple stack application, in order to maintain continuous power output, regeneration operations can be scheduled so that some stacks are in normal operation and others are being regenerated using the method above.

The regeneration procedures described above may be performed right after the stack is shut down or at the start up period. Because the purging operation is more effective at relatively high temperatures, it is preferred to perform the regeneration operations at the shut down process.

EXAMPLES

CCM Preparation Procedure:

The cathode catalyst dispersion was prepared in a Eiger® bead mill, manufactured by (Eiger Machinery Inc., Greybrlake, Ill. 60030), containing 80 ml 1.0-1.25 zirconia grinding media. 13.5 grams platinum black catalyst powder (catalyst grade (obtained from Colonial Metals, Elkton, Md.) and 42.8 grams of the 3.5 wt % Nafion® solution (the polymer resin used in such a solution was typically of 930EW polymer and was in the sulfonyl fluoride form) were mixed and charged into the mill and dispersed for 2 hours. Material was withdrawn from the mill and particle size measured. The ink was tested to ensure that the particle size was under 1 micron and the % solids in the range 13.56-13.8. The catalyst decal was prepared by drawing down the catalyst ink to a dimension of 5 cm×5 cm (to give a total area of 25 $cm^2$) on a 10 cm×10 cm piece of 3 mil thick Kapton® polyimide film manufactured by E.I. duPont de Nemours & Co., Wilmington, Del. A wet coating thickness of 5 mil (125 microns) typically resulted in a catalyst loading of 4 to 5 mgPt/$cm^2$ in the final CCM. Anode decals were prepared using a procedure similar to that described above, except that in the catalyst dispersion, the platinum black catalyst was replaced by platinum/ruthenium black catalyst powder (obtained from Johnson Mathey Inc.). The CCM is prepared by a decal transfer method. A piece of wet Nafion® N117 membrane (4"×4") in the $H^+$ form, manufactured by DuPont, was used for CCM preparation. The membrane was sandwiched between two anode and cathode catalyst coated decals. Care was taken to ensure that the coatings on the two decals were registered with each other and were positioned facing the membrane. The entire assembly was introduced between two pre-heated (to 145C) 8"×8" plates of a hydraulic press and the plates of the press were brought together without wasting much time until a pressure of 5000 lbs is reached. The sandwich assembly was kept under pressure for ~2 mins. and then the press was cooled for ~2 mins. (viz., till it reached a temperature of <60° C.) under same pressure. Then the assembly was removed from the press and the Kapton® films were slowly peeled off from the top of the membrane showing that the catalyst coating had been transferred to the membrane. The CCM was immersed in a tray of water to ensure that the membrane was completely wet, and carefully transferred to a zipper bag for storage and future use.

Chemical Treatment of CCMs

The CCMs were chemically treated in order to convert the ionomer in the catalyst layer from the —$SO_2F$ form to the —$SO_3H$ form. This requires a hydrolysis treatment followed by an acid exchange procedure. The hydrolysis of the CCMs was carried out in a 30-wt % NaOH solution at 80° C. for 30 min. The CCM's were placed between Teflon® mesh, manufactured by DuPont, and placed in the solution. The solution was stirred to assure uniform hydrolyses. After 30 minutes in the bath, the CCM's were removed and rinsed completely with fresh DI water to remove all the NaOH.

Acid exchange of the CCMs that were hydrolyzed in the previous step was done in 15 wt % Nitric Acid Solution at a bath temperature of 65° C. for 45 minutes. The solution was stirred to assure uniform acid exchange. This procedure was repeated in a second bath containing 15-wt % Nitric acid solution at 65° C. and for 45 minutes.

The CCMs were then rinsed in flowing DI water for 15 minutes at room temperature to ensure removal of all the residual acid. They were then packaged wet and labeled. The CCM (10) comprised a Nafion® perfluorinated ion exchange membrane (11); and electrodes (12), prepared from a platinum catalyst and Nafion® binder on the anode side, and a platinum/ruthenium catalyst and Nafion® binder on the cathode side.

Fuel Cell Performance Evaluation Procedure:

FIG. 1 schematically illustrates a single cell assembly. Fuel cell test measurements were made employing a single cell test assembly obtained from Fuel Cell Technologies Inc, New Mexico. As shown in FIG. 1, the MEA (30) comprised the CCM (10) sandwiched between two sheets of the GDB (13) (taking care to ensure that the GDB covered the catalyst coated area on the CCM). The anode gas diffusion backing (13) comprised carbon cloth and a fluorinated polymeric surface treating agent. The cathode diffusion backing comprised an ELAT with a single microporous layer from E-Tek Inc., Natick, Mass. The microporous layer was disposed toward the cathode catalyst. A glass fiber reinforced silicone rubber gasket (19) (Furan®—Type 1007, obtained from Stockwell Rubber Company, Philadelphia, Pa.), cut to shape to cover the exposed area of the membrane of the CCM, was placed on either side of the CCM/GDB assembly (taking care to avoid overlapping of the GDB and the gasket material). The entire sandwich assembly was assembled between the anode and cathode flow field graphite plates (21) of a 25 $cm^2$ standard single cell assembly (obtained from Fuel Cell Technologies Inc., Los Alamos, N. Mex.). The test assembly shown in FIG. 1 was also equipped with anode inlet (14), anode outlet (15), catholyte gas inlet (16), catholyte gas outlet (17), aluminum end blocks (18), tied together with tie rods (not shown), electrically insulating layer, (20), and gold plated current collectors, (22). The bolts on the outer plates (not shown) of the single cell assembly were tightened with a torque wrench to a force of 1.5 ft. lb.

Figure 2:
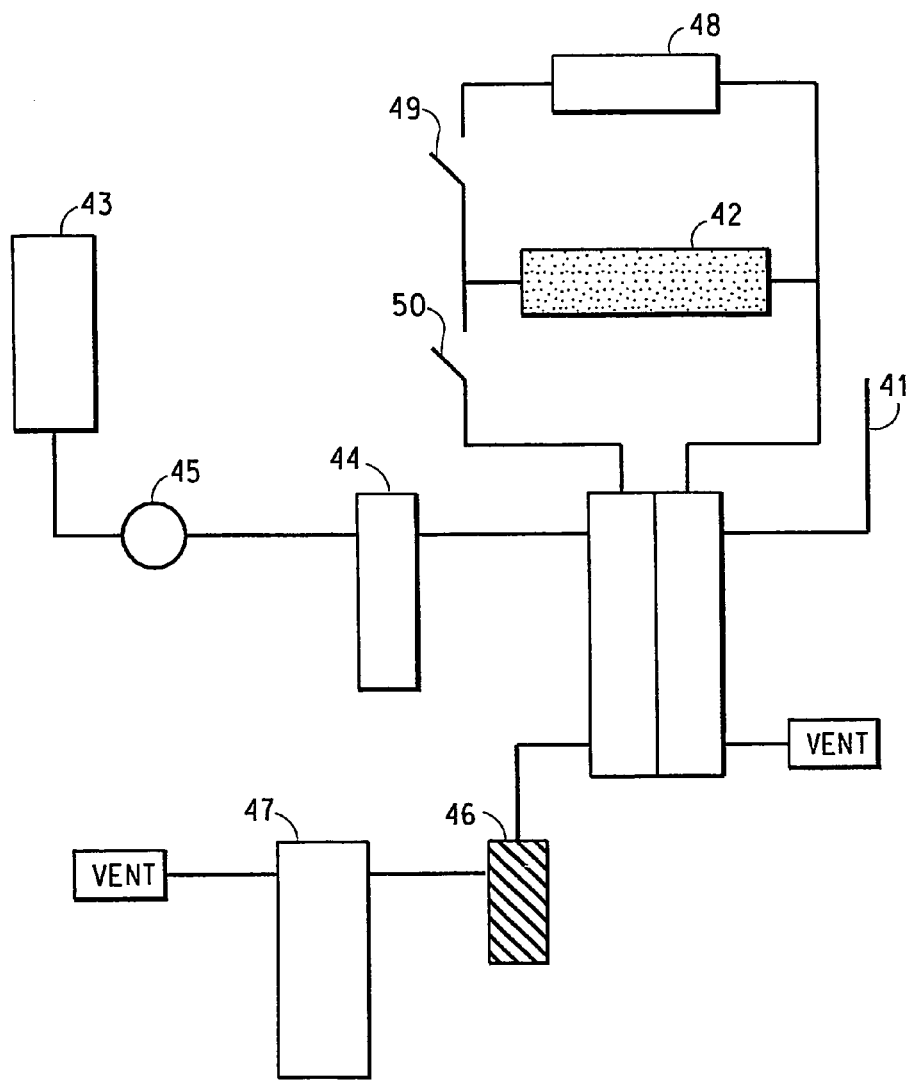
FIG. 2 is a schematic illustration of a typical DMFC system with external power source and a mechanism to change mode of cell operation between fuel cell mode and electrolysis mode.

The single cell assembly was then connected to the fuel cell testing system, a schematic of which is shown in the FIG. 2. The components in a test station include a supply of air for use as catholyte gas (41); a load box to regulate the power output from the fuel cell (42); a MeOH solution tank to hold the feed anolyte solution (43); a heater to pre-heat the MeOH solution before it enters the fuel cell (44); a liquid pump to feed the anolyte solution to the fuel cell at the desired flow rate (45); a condenser to cool the anolyte exit from the cell from the cell temperature to room temperature (46) and a collection bottle to collect the spent anolyte solution (47), power source (48) and power switches 49 and 50.

With the cell at room temperature, 1M MeOH solution and air were introduced into the anode and cathode compartments through inlets (14) and (16) of the cell at flow rates of 25 cc/min and 3 SLPM (standard liters per minute), respectively. The gas streams were humidified with water vapor before they entered the cell. The temperature of the single cell was slowly raised till it reached 80° C. Typically, a current-voltage polarization curve was recorded. This comprised of recording the current output from the cell as the voltage was stepped down in 50 mV steps starting from the open circuit voltage (OCV) down to 0.2 V and back up to OCV. The voltage was held constant in each step for 20 sec to allow for the current output from the cell to stabilize.

EXAMPLE 1

A standard 25 cm² CCM prepared as described above was assembled in a cell. The cell was heated to a temperature of 60° C. 1M MeOH solution was used as the anolyte and a flow rate of 2 ml/min. Air was used as the oxidant at 100 sccm. The cell was tested at a constant load of 50 mA/cm2 and the cell voltage was monitored with time. After 50 hrs of operation under these conditions, the cell voltage had dropped by more than 20% from the initial value At this point, the load on the cell is taken out and a external voltage is applied to the cell and the voltage is cycled six times with the anode flow continuing. After this voltage cycling, the load (of 50 mA/cm2) is again applied to the cell and the voltage is monitored with time. Significant recovery of cell performance is expected. Immediately following the voltage cycling sequence, the cell voltage (under the constant load) is expected to return to 0.4V (the value at the beginning of the test) proving the effectiveness of the voltage cycling sequence in regenerating the lost fuel cell catalytic activity. This may be as shown by surface area measurement and performance.

EXAMPLE 2

A fresh 25 cm² CCM prepared as described above is loaded in a cell and the cell voltage is cycled between 0V and 1.3 V at a rate of 20 mV/sec using an external power supply at RT. A total of 10 cycles is performed. Then a standard IV curve may be recorded on the sample at RT (0.8V to 0.2V and back to 0.8V in 50 mV steps and 20-sec delay at each step). It is expected that there would be a definite improvement in performance upon cycling.

This experiment would demonstrate that the polarization of a cell using an external applied electric field at room temperature by cycling between a maximum voltage and minimum voltage applied to the fuel cell improves cell performance.

EXAMPLE 3

This example shows the regeneration of a fuel cell using the following steps: An impedance meter was connected across a cell needing regeneration and identified in the graph as EO48. The cell had a voltage or power output about 15% lower than the desired value. This was done under load at 200 mA/cm² to measure the cell resistance (both when on load and when on open circuit). The cell resistance was found to be 6.9 mOhm. This was followed by the cell being brought to an open circuit, i.e., the load on the cell was taken out. Next, the flow of anolyte [1M MeOH solution] through the cell was stopped. The flow of catholyte gas, which was air, through the cell was continued throughout the process and the resistance of the cell was closely monitored. After a certain period of time the cell resistance slowly crept up and increased to 55 mOhm and the cell was left under these conditions for 60 seconds. Next, the anolyte [1M MeOH solution] flow through the cell was turned on at a rate Of 25 ml/min. The resistance of the cell was monitored and the cell was cycled between open circuit voltage (no load) and 0.2V until the resistance dropped to 7.2 mOhm. The cell was then set at 200 mA/cm² load to return it to normal operation.

The process steps outlined above resulted in considerable improvement in performance of the cell, after regeneration as compared to that before regeneration, both in terms of the power output and the rate of drop in voltage with time. This process was repeated after every 36 hours of operation of the under load (of 200 mA/cm2) to regenerate the cell.

EXAMPLE 4

A comparison is made between the performance of two samples that were prepared as described in the CCM Preparation Procedure, one regenerated using DC voltage and the other using AC voltage. The AC voltage amplitude is 2.0 V at a low frequency of 16 Hz. Both DC and AC voltage regeneration are expected to be effective in recovering cell catalytic activity and performance as shown by increase of electrochemical active area and performance enhancement.

EXAMPLE 5

Example 2 is repeated with the following exception: An impedance meter is connected across a cell needing regeneration. The cell has a voltage or power output about 15% lower than the desired value. This is done under load at 200 mA/cm² to measure the cell resistance (both when on load and when on open circuit). The cell resistance is found to be 6.9 mOhm. This is followed by the cell being brought to an open circuit, i.e., the load on the cell is taken out. Next, the flow of anolyte [1M MeOH solution] through the cell is stopped. The flow of catholyte gas, which is air, through the cell is continued throughout the process and the resistance of the cell is closely monitored. After a certain period of time the cell resistance is expected to slowly creep up and increases to 55 mOhm and the cell is left under these conditions for 60 seconds. Next, the anolyte [1M MeOH solution] flow through the cell is turned on at a rate Of 25 ml/min. The resistance of the cell is monitored and the cell is cycled between open circuit voltage (no load) and 0.2V until the resistance dropped to 7.2 mOhm. The cell is then set at 200 mA/cm² load to return it to normal operation.

The process steps outlined above are expected to result in considerable improvement in performance of the cell, after regeneration as compared to that before regeneration, both in terms of the power output and the rate of drop in voltage with time. This process is repeated after every 36 hours of operation of the under load (of 200 mA/cm2) to regenerate the cell.

What is claimed is:

1. A process for improved performance in at least one fuel cell, having a loss in power output of at least 5% of an initial power output, wherein the fuel cell comprises a cathode, an anode, an anode chamber, a cathode chamber, a fuel comprising an anolyte that flows through the cell, and a catholyte gas, wherein the fuel cell is connected to an external load, and wherein the process comprises:
    (a1) taking the load off the fuel cell; and
    (a2) applying an external electric field from an external power source to the fuel cell to reverse electrochemical reactions until at least 5.0% of the lost power output is regained.
2. The process of claim 1 wherein the applying an electric field from an external power source to the fuel cell to reverse electrochemical reactions occurs by, either:
    (a2a) cycling between a minimum voltage and a maximum voltage applied to the fuel cell until a maximum current is reached;
    (a2b) cycling between a minimum current and a maximum current applied to the fuel cell until a minimum voltage is reached;

(a2c) applying an alternating voltage (AC voltage) until a maximum current is reached;
(a2d) applying an alternating current until a maximum voltage is reached across the fuel cell;
(a2e) applying a constant voltage until a maximum current is reached; or
(a2f) applying a constant current until a minimum voltage is reached.

3. The process of claim 1 wherein the power source is selected from the group consisting of batteries, capacitors, solar cells, and another fuel cell.

4. The process of claim 1 wherein the fuel cell is a direct feed fuel cell.

5. The process of claim 4 wherein the fuel is in the liquid or vapor phase.

6. The process of claim 5 wherein the fuel is an alcohol or an ether.

7. The process of claim 6 wherein the alcohol is methanol or ethanol.

8. The process of claim 6 wherein the ether is diethyl ether.

9. The process of claim 1 wherein at least 25% of the lost power output is recovered.

10. The process of claim 9 wherein at least 50% of the lost power output is recovered.

11. The process of claim 2 wherein the voltage was cycled between about 0 V and about 2.3 V.

12. The process of claim 2 wherein the current was cycled between about 0 to about 2 A/cm$^2$.

13. The process of claim 2 wherein the AC voltage amplitude is about 0 to about 3 V per cell, and the frequency is about 16 to about 500 Hz.

14. The process of claim 2 wherein the AC current amplitude is about 0 to about 2 A/cm$^2$ root mean squares (rms), and the frequency is about 16 to about 500 Hz.

15. The process of claim 1 wherein before step (a2), the process further comprises:
(b) clearing the fuel cell of any liquid present therein to achieve a resistance of at least about 10% higher than the value before clearing the cell of any liquid; and
(c) starting the flow of anolyte through the fuel cell.

16. The process of claim 15 wherein the clearing of the fuel cell of any liquid present therein is achieved by:
(b1) stopping the flow of anolyte through the fuel cell; and
(b2) providing a continuous flow of catholyte gas through the fuel cell for at least 30 seconds.

17. The process of claim 15 further comprising:
(d) oxidizing the residual fuel in the fuel cell.

18. The process of claim 17 wherein oxidizing the residual fuel in the fuel cell is achieved by breaking the electrical connection between the cathode and anode.

19. The process of claim 17 wherein oxidizing the residual fuel in the fuel cell is achieved by applying a constant voltage in the range of about 0.005 V to about 0.8 V per cell.

20. The process of claim 15 wherein before step (c), the anode chamber is purged with air.

21. The process of claim 15 wherein before step (c), the anode chamber is purged with nitrogen.

22. The process of claim 15 wherein after step (a1) the anode chamber of the fuel cell is purged with water.

23. The process of claim 17 wherein before step (c) the anode chamber of the fuel cell is purged with air.

24. The process of claim 15 wherein the before step (c), the cathode chamber is purged with air.

25. The process of claim 20 wherein the cathode chamber is purged with air.

26. The process of claim 24 or 25 wherein the cathode chamber is purged with air for at least 10 seconds.

27. The process of claim 24 wherein the anode chamber is purged with air after the cathode chamber is purged.

28. The process of claim 24 wherein the anode chamber is purged with nitrogen after the cathode chamber is purged.

29. The process of claim 27 wherein the air comprises exhaust air from the cathode chamber.

30. The processes of claim 27, 28, or 29 wherein the anode chamber is purged for about 2-15 minutes.

31. The processes of claim 30, wherein the anode chamber is purged for about 5-15 minutes.

32. The processes of claim 31, wherein the anode chamber is purged for about 10-15 minutes.

33. The process of claim 15 wherein the resistance reached is at least about 20% higher than the value before clearing the cell of any liquid.

34. The process of claim 33 wherein the resistance reached is about 100 to about 500% higher than the value before clearing the cell of any liquid.

35. The process of claim 1 wherein fuel cells are in a stack.
36. The process of claim 15 wherein fuel cells are in a stack.
37. The process of claim 17 wherein fuel cells are in a stack.

* * * * *